M. M. BAILEY.
VEHICLE WHEEL.
APPLICATION FILED JUNE 26, 1916.
1,403,001.
Patented Jan. 10, 1922.
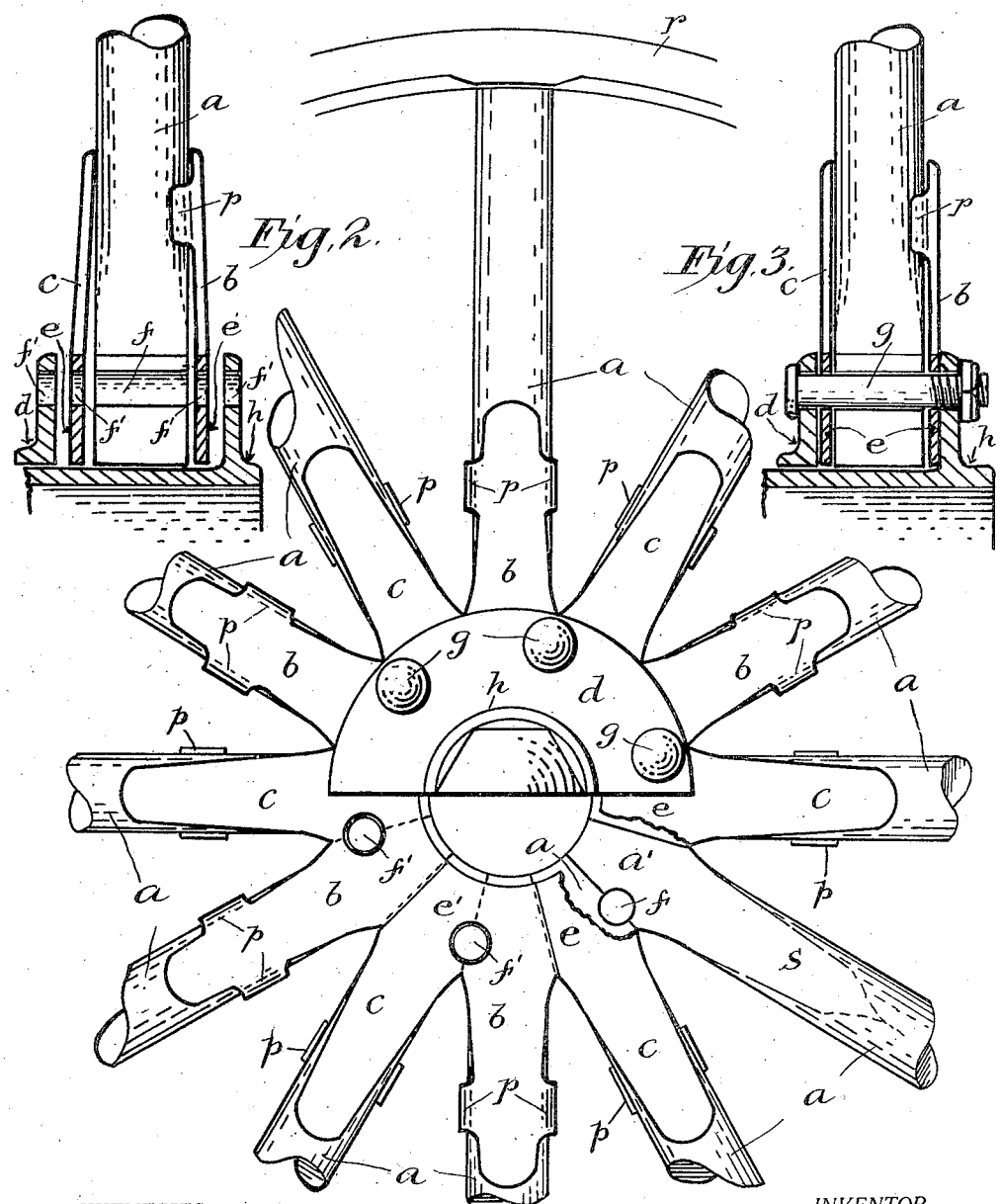
WITNESSES:
INVENTOR.
Marion Milton Bailey.

UNITED STATES PATENT OFFICE.

MARION MILTON BAILEY, OF DETROIT, MICHIGAN.

VEHICLE WHEEL.

1,403,001.  Specification of Letters Patent.  Patented Jan. 10, 1922.

Application filed June 26, 1916. Serial No. 105,933.

*To all whom it may concern:*

Be it known that I, MARION MILTON BAILEY, a citizen of the United States of America, residing at Detroit, county of Wayne and State of Michigan, have invented certain new and useful Improvements in Vehicle Wheels; that I do hereby declare the following to be a full, clear, and exact description of the same, such as will enable persons skilled in the art to which they appertain to make and use the same.

My invention relates to vehicle wheels, economical, durable, and strong, with increased flexibility and greater resistance to lateral and other thrusts, in which the flexible, supporting members are so related to the other members of the wheel as to in no way interfere with the rotation of the wheel and its hub in being either driven or drawn; in which the flexible members are rigidly attached to the hub portion and central part of the wheel proper in such manner as to absorb considerable portions of the lateral thrusts which commonly push the hub out of the wheel proper; and, in which more plentiful and less expensive woods and metals afford materials for practical use in spokes, rims, and other wheel parts.

With these and other objects in view, which may hereinafter appear and be more particularly pointed out and specifically claimed, my invention consists of the means shown, and their equivalent, for carrying into practical execution the objects as above outlined.

While my invention may be adapted to different forms and conditions by modification in the structure and minor details without departing from the essential features thereof, of which the following is a specification, the preferred embodiment is shown in the accompanying drawings in which corresponding and like parts are indicated and referred to by the same reference characters.

Figure 1 is a side elevation of my wheel invention, with sections thereof removed, showing the working disposition of the flexible, supporting, annular members, showing the preferred shape of the wheel spokes, and showing the normal disposition of the hub and the wheel proper portions relative to the flexible, sectional, supporting annular members "$e$," and to each other. Figure 2 is a sectional view of portions of the wheel showing the normal relations of the detachable hub portions, the preferred shape of the wheel spokes, and the flexible, sectional, supporting annular members "$e$"; showing normal bend or incline of the flexible, sectional, supporting annular members "$e$" toward the wheel spokes; and showing the thrust absorbing keepers "$p$" on arms of the sectional, annular members "$e$," with an approximate relationship of said keepers to the wheel spokes. Figure 3 is a sectional view, similar to that in Figure 2, showing the fixed hub portions, the wheel spokes, the sectional annular members "$e$" and keepers "$p$" rigidly bolted together in working disposition.

My invention consists, preferably, of a properly spoked wheel, a wheel hub, and sectional annular members "$e$" secured to both sides of the central parts of the wheel, with flexible, radial arms "$c$" and "$b$" integral with said sectional annular members "$e$," extending radially along the wheel plane, and loosely engaging the spokes between the hub flange and the wheel rim.

In more particularly describing my invention, it will be observed, in Figures 1 and 3, that the hub portion of my wheel consists of any approved type of vehicle wheel hub "$h$" secured to the wheel proper portion "$r$" in any approved manner, as by bolts "$g$" and flange "$d$," and fitted to the vehicle axles with any approved boxing or bearing.

The lateral sides of spokes "$a$" extending radially outward from the hub flanges, have flat faces "$s$" which are radial extensions of the spoke faces "$a'$," and are of proper width and length to fully seat the inner faces of radial arms "$c$" and "$b$," Figures 1, 2, and 3. It will be seen also that the usual form of vehicle wheel wood spokes affords seats on each side of faces "$s$" to engage the inside faces of keepers "$p$." The sectional, annular, wheel supporting members "$e$," Figures 1, 2, and 3, preferably of spring steel, have arms "$c$" and "$b$," preferably flat and inwardly inclined, extending in working disposition radially along the plane of the wheel, Figures 1 and 3, on one or both sides thereof. The sectional, annular members "$e$" with radial arms "$c$" and "$b$," may be each composed of assembled sections. These flexible armed, sectional, annular members "$e$" may be secured to the hub flange and to the spoked wheel, in any approved manner, preferably by means of bolts "$g$," through suitable holes "$f$" and "$f'$," Figures 1 and 3. The keepers "$p$" on arms "$b$" are curved or angled inwardly to rotatively engage the spokes "a." The wheel proper may be of any approved model, with metal or wood spokes suited to carry faces "s," and to engage the keepers "p," Figure 1.

Having fully described the construction of my invention so that any one skilled in the art may build and assemble its parts, I desire to more fully describe some of the action and cooperation of its members in use. Having formed the wheel proper with spokes "a" with engaging faces "s," Figure 1, and having shaped the sectional annular members "e" and sections thereof "e'," Figures 1 and 2, with the alternating arms "c" and "b," corresponding in number with the spokes "a" in the wheel proper, the several parts are assembled loosely as in Figure 2 in which the close seating and firm holding of the radial arms "c" and "b" against the ground wheel proper portion by reason of the normal inward incline of the said arms may be well understood. Next, placing the preferable bolts "g," and, by means of them securely binding the wheel assemblage into a rigid unit, the wheel becomes a working assemblage as shown in Figures 1 and 3.

It will be now readily observed that by reason of the wheel support from keepers "p" through the radial arms "b" of the members "e" and sections "e'," the wheel is thereby supported against rotative thrusts and contact shocks through the wheel plane. It will be also readily observed that by reason of the lateral support of the flexible arms "c" and "b," of members "e" and sections "e'," along and against the wheel spokes "a," the wheel is shock-absorbingly supported against lateral thrusts, thus affording greater wheel endurance and the use of weaker wheel spoke material while maintaining a given standard of wheel strength.

Since the flexible spring arms "c" and "b" engage and support the spokes the entire length of the said arms, and since the said spring arms increase in width and corresponding fulcrum strength from the radially outer ends to the hub flange periphery co-ordinately with the increase in leverage of the spoke lengths applying to said spring arms against the hub load of the lateral thrusts against the wheel, lateral thrusts against the wheel are distributed along the flexible spring arms and corresponding portions of the wheel spokes, and are safely shared and absorbed in cooperation with the greater deflecting portions of the spoke shafts. As a means of affording simple and economical substitution renewals of the sectional annular wheel members "e" with flexible radial arms "c" and "b," these members may be assembled from two-spoke engaging sections "e'."

Having fully described the construction and operation of my invention, what I particularly claim is, 1. A sectional annular body, substantially as described, adapted to be assembled in a vehicle wheel, with flat, radial, flexible arms adapted to support the wheel spokes against lateral and rotative thrusts.

2. In a vehicle wheel detachable, interchangeable, radial armed sections rigidly secured to the sides of the said wheel, and adapted to flexibly support the said wheel against lateral thrusts.

3. In a vehicle wheel having a spoked portion with a detachable hub part attached thereto, sectional annular members with radial spring arms secured to the spoked portion and to the hub portion, and adapted to flexibly support the said wheel, against lateral and rotative thrusts, substantially as described.

In testimony whereof, I affix my signature in the presence of two witnesses.

MARION MILTON BAILEY.

Witnesses:
LEWELL C. JACKSON,
M. GAGE.